(12) United States Patent
Chen

(10) Patent No.: US 9,464,417 B2
(45) Date of Patent: Oct. 11, 2016

(54) CERAMIC VALVE WITH A MIDDLE SECTION HAVING A COLD WATER SUPPLY FUNCTION

(71) Applicant: Mei-Li Chen, Tanzih Township, Taichung County (TW)

(72) Inventor: Mei-Li Chen, Tanzih Township, Taichung County (TW)

(73) Assignee: KUCHING INTERNATIONAL LTD., Tanzih Township, Taichung County (TW)

( * ) Notice: Subject to any disclaimer, the term of this patent is extended or adjusted under 35 U.S.C. 154(b) by 50 days.

(21) Appl. No.: 14/570,492

(22) Filed: Dec. 15, 2014

(65) Prior Publication Data

US 2016/0168829 A1    Jun. 16, 2016

(51) Int. Cl.
| | |
|---|---|
| *E03C 1/04* | (2006.01) |
| *F16K 11/056* | (2006.01) |
| *F16K 31/60* | (2006.01) |
| *F16K 11/078* | (2006.01) |
| *F16K 11/074* | (2006.01) |
| *E03C 1/02* | (2006.01) |

(52) U.S. Cl.
CPC ............ *E03C 1/041* (2013.01); *F16K 11/056* (2013.01); *F16K 11/0746* (2013.01); *F16K 11/0787* (2013.01); *F16K 31/605* (2013.01); *E03C 2001/026* (2013.01); *Y10T 137/86823* (2015.04)

(58) Field of Classification Search
CPC ............. F16K 11/0787; F16K 11/074; F16K 11/0746; F16K 11/02; F16K 11/056; Y10T 137/86823; E03C 1/041
USPC ........................................ 137/625.17, 625.41
See application file for complete search history.

(56) References Cited

U.S. PATENT DOCUMENTS

| | | | | |
|---|---|---|---|---|
| 5,329,958 | A * | 7/1994 | Bosio .................... | F16K 11/078 137/269 |
| 6,170,523 | B1 * | 1/2001 | Chang ................. | F16K 11/0787 137/625.17 |
| 7,134,452 | B2 * | 11/2006 | Hiroshi et al. ...... | F16K 11/0787 137/625.41 |
| 8,490,653 | B2 * | 7/2013 | Chen ................... | F16K 11/0787 137/625.4 |
| 9,091,357 | B2 * | 7/2015 | Chen ................... | F16K 11/0782 |

* cited by examiner

*Primary Examiner* — Kevin Lee
(74) *Attorney, Agent, or Firm* — Egbert Law Offices, PLLC

(57) ABSTRACT

A ceramic valve includes a casing, a drive seat, a coupling seat, a rotary block and a fixed block sequentially mounted into the casing, wherein a braking shaft is pivotally connected to the drive seat and extends through a top of the casing. A pedestal is sealingly secured on a bottom of the casing for positioning the drive seat, the coupling seat, the rotary block and the fixed block. The rotary block is moved relative to the fixed block to guide cold water into the ceramic valve when the ceramic valve is in a middle section and the braking rod is operated to an inclined status.

5 Claims, 6 Drawing Sheets

CERAMIC VALVE WITH A MIDDLE SECTION HAVING A COLD WATER SUPPLY FUNCTION

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a ceramic valve, and more particularly to a ceramic valve with a middle section having a cold water supply function.

2. Description of Related Art Including Information Disclosed Under 37 CFR 1.97 and 37 CFR 1.98.

Recently, the operational safety of a cold/hot water faucet (hereinafter referred to as a dual-temperature faucet), especially its anti-scalding function, is of great concern in the industry. For this reason, multiple dual-temperature faucets with anti-scalding function have been developed. For example, a retaining structure is set on the switching path, so the user has to apply a greater force when switching to hot water mode.

In view of the currently available dual-temperature faucet, if the user pulls up the handle already set on the middle section, the preset water supply is in a mixed state, rather than in a cold water state. However, some shortcomings are still observed from the structural design of such a dual-temperature faucet. If cold water supply state is required when the handle of the dual-temperature faucet is pulled up, the user may firstly turn the handle to the ready position for cold water and then pull up the handle properly. Yet, due attentions shall be paid to more scalding possibilities in anti-scalding design. Assuming that the handle is pulled up unintentionally or unwittingly by the user (e.g. children of the elderly) from the middle section, a mixed water state would be expected, but in fact there exist some unstable factors, for example, when water supply pressure at the cold water end is weak, this permits direct switching to hot water mode, leading to scalding hazards. Besides, the swinging angles of warm/hot water modes for the dual-temperature faucet differ very little, this will turn to hot water mode once the user slightly shifts or impinges on it. On the other hand, when the user pulls up the handle from the middle section, since the cold/hot water inlets are partially open, insufficient water pressure makes it impossible to ignite gas for hot water, leading possible to gas leakage.

Furthermore, when the handle of conventional dual-temperature faucet is reset, the user could also reset it to the ready position for cold water, and then pulls up directly for a cold water supply state. To realize the balance of aesthetic effects, most of the user often reset the handle to the middle position after closing the faucet, especially in hotels and guesthouse where quality of service and customer satisfaction are of top priority. Hence, a feasible solution against the aforementioned problems is how to improve the design of the inner ceramic valve structure of a dual-temperature faucet.

Thus, to overcome the aforementioned problems of the prior art, it would be an advancement if the art to provide an improved structure that can significantly improved efficacy.

Therefore, the inventor has provided the present invention of practicability after deliberate design and evaluation based on years of experience in the production, development and design of related products.

BRIEF SUMMARY OF THE INVENTION

The main objective of the present invention is to provide an improved ceramic valve that is formed with a middle section having a cold water supply function.

To achieve the objective, ceramic valve comprises a casing, a drive seat, a coupling seat, a rotary block and a fixed block sequentially mounted into the casing, wherein a braking shaft is pivotally connected to the drive seat and extends through a top of the casing. A pedestal is sealingly secured on a bottom of the casing for positioning the drive seat, the coupling seat, the rotary block and the fixed block. The casing is a hollow structure and has a protrusion extending therefrom, wherein a top opening is defined in a distal end of the protrusion and a bottom opening is defined in the bottom of the casing. The drive seat includes a lower plate and a tubular portion upward extending from the lower plate. The lower plate abuts against a lower end of the protrusion of the casing and the tubular portion is rotatably received in the protrusion. The drive seat includes a cavity centrally defined therein. The braking rod is pivotally connected to the tubular portion of the drive seat by a pin. The braking rod includes a toggle end extending through drive seat and received in the coupling seat, and a trigger formed on a top end of the braking rod, wherein the trigger upwardly extending through the drive seat. The pedestal is secured in the bottom opening and includes a cold water inlet, a hot water inlet and an outlet respectively defined therein, wherein the cold water inlet guides cold water into the ceramic valve, the hot water inlet guides hot water into the ceramic valve and the outlet allows the mixed water flowing out of the ceramic valve. The fixed block is securely and sealingly disposed on the top of the pedestal. The fixed block includes a first through hole, a second through hole and a third through hole respectively defined therein, wherein the first through hole, the second through hole and the third through hole respectively communicate with the cold water inlet, the hot water inlet and the outlet in the pedestal. The rotary block is rotatably disposed on the fixed block. The rotary block includes a tunnel defined therein. The tunnel selectively communicates with the first through hole, the second through hole and the third through hole when the rotary block is rotated relative to the fixed block. The coupling seat is disposed between the rotary block and the lower plate of the drive seat, wherein the coupling seat is synchronously rotated with the rotary block. A trough is defined in the top face of the coupling seat for receiving the toggle end of the braking rod. A biased fulcrum unit is disposed between the drive seat and the coupling seat. The biased fulcrum includes a flanged protrusion downward extending from an edge of the lower plate and an indentation defined in the top face of the coupling seat, wherein the flanged protrusion is received in the indentation.

The ceramic valve provides cold water when being in the middle section and pulling the braking rod from an upright status to an inclined status and then the tunnel in the rotary block is moved to communicate with the first through hole in the fixed block to achieve the cold water function in the middle section of the ceramic valve in accordance with the present invention, wherein the first through hole communicates with the cold water inlet in the pedestal.

Further benefits and advantages of the present invention will become apparent after a careful reading of the detailed description with appropriate reference to the accompanying drawings.

DETAILED DESCRIPTION OF THE INVENTION

Figure 1:
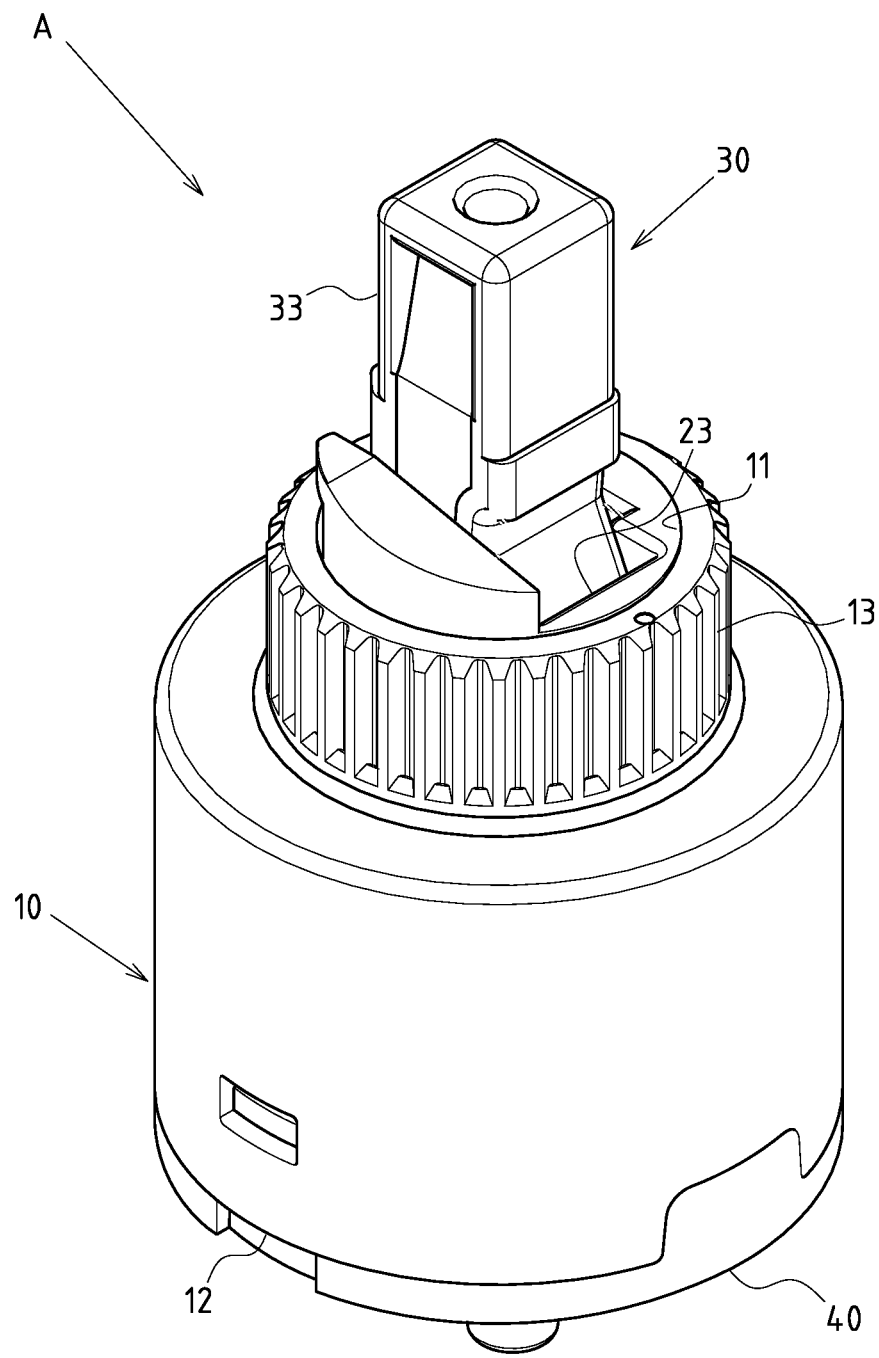
FIG. 1 is a perspective view of a ceramic valve with a middle section having a cold water supply function in accordance with the present invention.

Referring to the drawings and initially to FIGS. 1-5, a ceramic valve A with a middle having a cold water supply function in accordance with the present invention comprises a casing 10, a drive seat 20, a coupling seat 70, a rotary block 60 and a fixed block 50 sequentially mounted into the casing 10, wherein a braking shaft 30 is pivotally connected to the drive seat 20 and extends through a top of the casing 10. A pedestal 40 is sealingly secured on a bottom of the casing 10 for positioning the drive seat 20, the coupling seat 70, the rotary block 60 and the fixed block 50.

The casing 10 is a hollow structure and has a protrusion 13 extending therefrom, wherein a top opening 11 is defined in a distal end of the protrusion 13 and a bottom opening 12 is defined in the bottom of the casing 10. The drive seat 20 includes a lower plate 21 and a tubular portion 22 upward extending from the lower plate 21. The lower plate 21 abuts against a lower end of the protrusion 13 of the casing 10 and the tubular portion 22 is rotatably received in the protrusion 13. The drive seat 21 includes a cavity 23 centrally defined therein.

The braking rod 30 is pivotally connected to the tubular portion 22 of the drive seat 20 by a pin 31. The braking rod 30 includes a toggle end 32 extending through drive seat 20 and received in the coupling seat 70, and a trigger 33 formed on a top end of the braking rod 30, wherein the trigger 33 upwardly extending through the drive seat 20.

The pedestal 40 is secured in the bottom opening 12 and includes a cold water inlet 41, a hot water inlet 42 and an outlet 43 respectively defined therein, wherein the cold water inlet 41 guides cold water into the ceramic valve A, the hot water inlet 42 guides hot water into the ceramic valve A and the outlet 43 allows the mixed water flowing out of the ceramic valve A. The fixed block 50 is securely and sealingly disposed on the top of the pedestal 40. The fixed block 50 includes a first through hole 51, a second through hole 52 and a third through hole 53 respectively defined therein, wherein the first through hole 51, the second through hole 52 and the third through hole 53 respectively communicate with the cold water inlet 41, the hot water inlet 42 and the outlet 43 in the pedestal 40. The rotary block 60 is rotatably disposed on the fixed block 50. The rotary block 60 includes a tunnel 61 defined therein. The tunnel 61 selectively communicates with the first through hole 51, the second through hole 52 and the third through hole 53 when the rotary block 60 is rotated relative to the fixed block 50.

The coupling seat 70 is disposed between the rotary block 60 and the lower plate 21 of the drive seat 20, wherein the coupling seat 70 is synchronously rotated with the rotary block 60. A trough 71 is defined in the top face of the coupling seat 70 for receiving the toggle end 32 of the braking rod 30.

Figure 6:
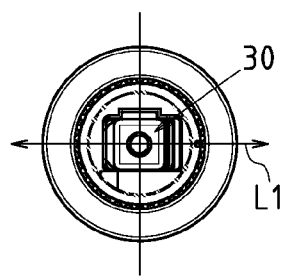
FIG. 6 is a top plan view of the ceramic valve when the braking rod of the ceramic valve extends along an axis of the ceramic valve.
Figure 8:
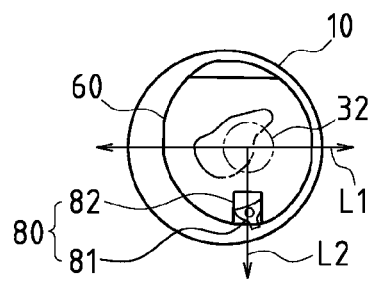
FIGS. 8 and 9 are operational views of the ceramic valve when the braking rod of the ceramic valve extends along an axis of the ceramic valve.

A biased fulcrum unit 80 is disposed between the drive seat 20 and the coupling seat 70. The biased fulcrum 80 has a flanged protrusion 81 downward extending from an edge of the lower plate 21 and an indentation 82 defined in the top face of the coupling seat 70, wherein the flanged protrusion 81 is received in the indentation 82. With reference to FIGS. 6 and 8, the line L2 (as shown in FIG. 8) of centers of the protrusion 81 and the toggle end 32 is vertical to the motion trail L1 (as shown in FIGS. 6 and 8) of the braking rod 30 when the braking rod 30 extends along the axis of the ceramic valve A. In addition, the situation of the biased fulcrum unit 80 corresponds to the first through hole 51 in the fixed block 50.

Figure 10:
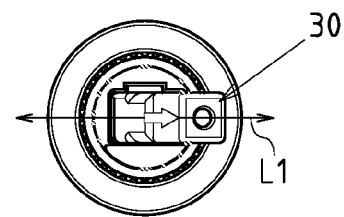
FIG. 10 is top plan view of the ceramic calve when the braking rod of the ceramic valve is inclined relative to the axis of the ceramic valve.
Figure 7:
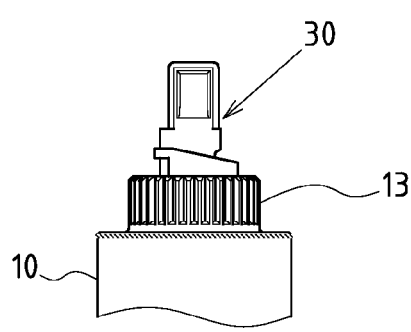
FIG. 7 is a side plan view of the ceramic valve when the braking rod of the ceramic valve extends along an axis of the ceramic valve.
Figure 11:
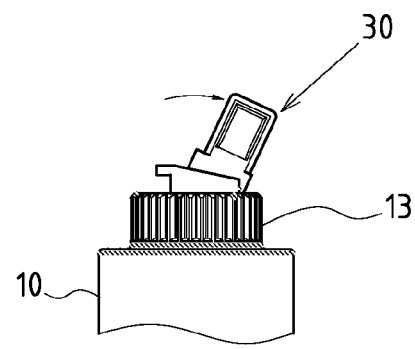
FIG. 11 is side plan view of the ceramic calve when the braking rod of the ceramic valve is inclined relative to the axis of the ceramic valve.

With reference to FIGS. 6-8 and 10-12, the toggle end 32 of the braking rod 30 is moved along a straight line to drive the coupling seat 70 and the rotary block 60 when the braking rod 30 is in the middle section of the ceramic valve A and is operated from an upright status (as shown in FIG. 7) to an inclined status (as shown in FIG. 11). Then, the coupling seat 70 and the rotary block 60 is moved along a curved route and the biased fulcrum unit 80 is used a center of the curved route. As result, the tunnel 61 is moved to communicate with the first through hole 61 and the third through hole 53 (as shown in FIG. 13) for providing cold water when the ceramic valve A in accordance with the present invention is in the middle section.

Figure 12:
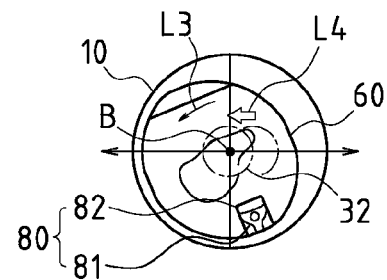
FIGS. 12 and 13 are operational views of the ceramic valve when the braking rod of the ceramic valve is inclined relative to the axis of the ceramic valve.
Figure 9:
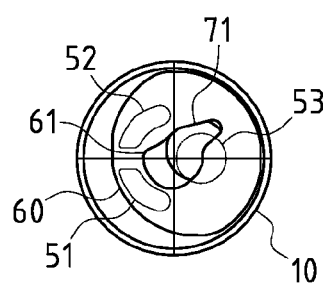
Figure 13:
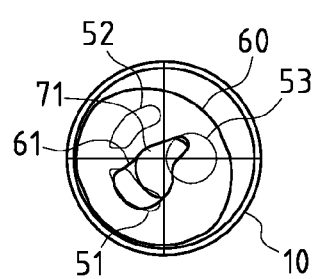

With reference to FIGS. 6, 10 and 12, the toggle end 32 of the braking rod 30 is moved toward the center B of the casing 10 along the direction of the arrow L4 in FIG. 12 during the braking rod 30 being operated from the upright status to the inclined status. By such a manner, rotary block 60 has a long curved moving route relative to the biased fulcrum unit 80.

Figure 2:
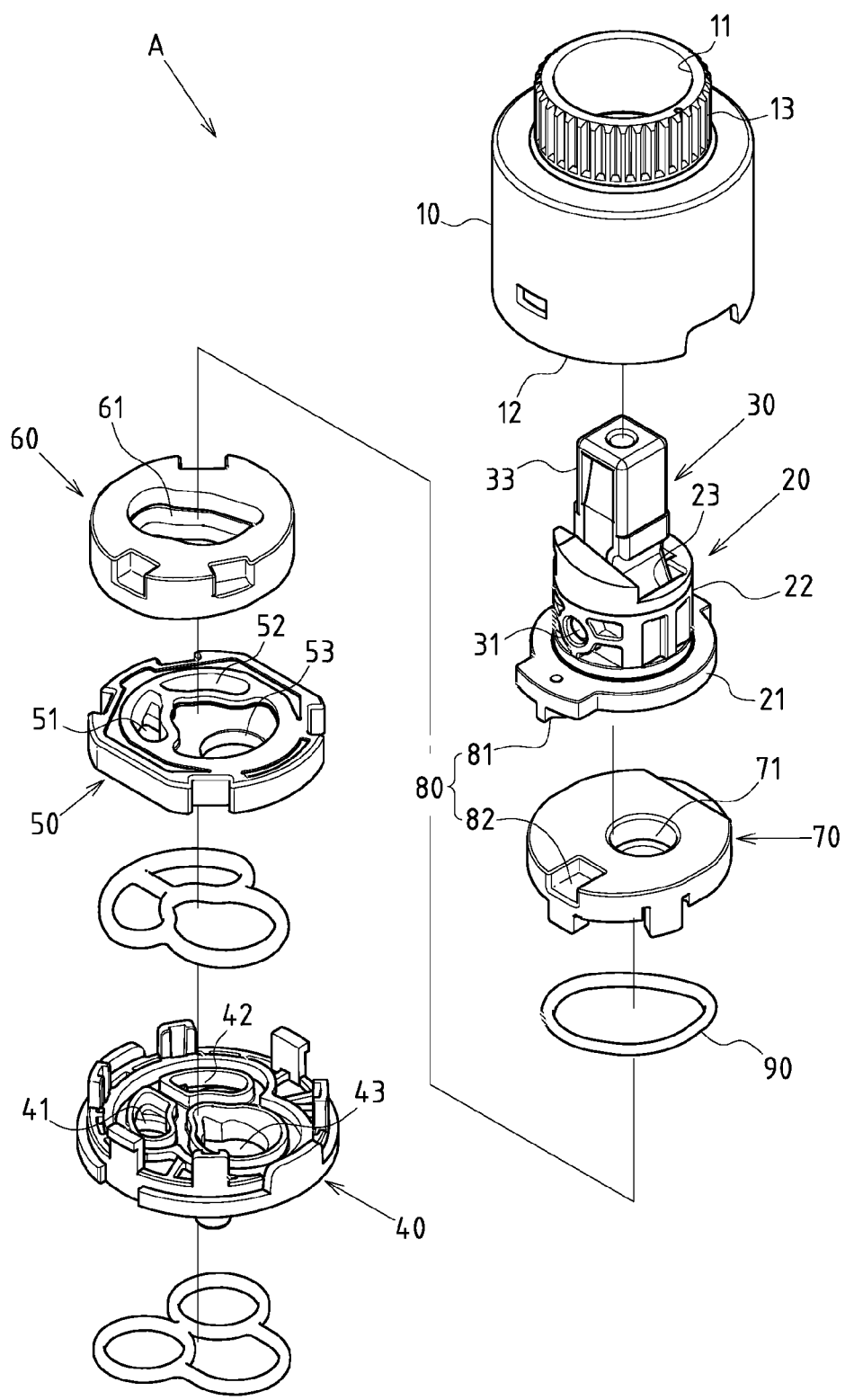
FIG. 2 is an exploded perspective view of the ceramic valve in FIG. 1.
Figure 3:
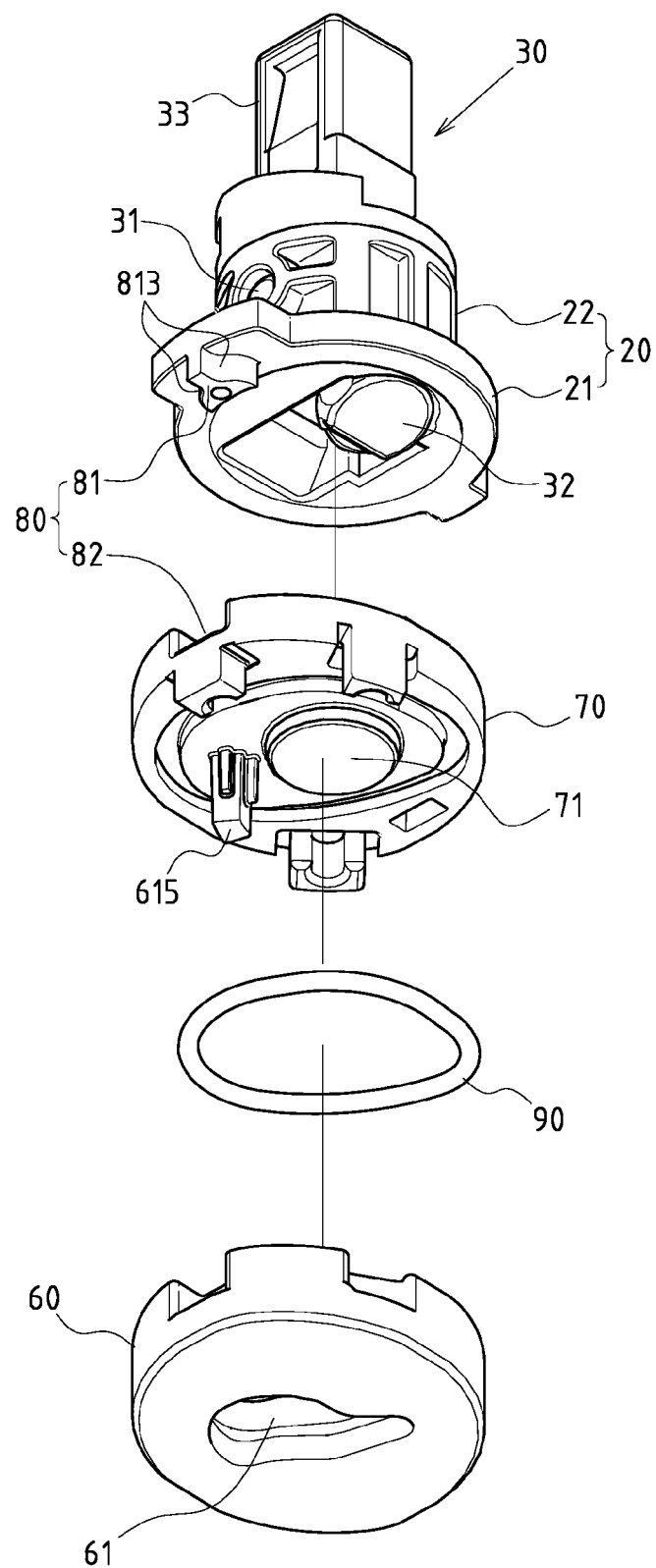
FIG. 3 is an partially exploded perspective view of the ceramic valve in FIG. 1 in another direction.

With reference to FIGS. 2 and 3, the indentation 82 in the coupling seat 70 is rectangle and the flanged protrusion 81 can be triangle, circle, rectangle or polygonal. In the preferred embodiment of the present invention, the flanged protrusion 81 is triangle and has two inclined portions 813 formed thereon.

Figure 4:
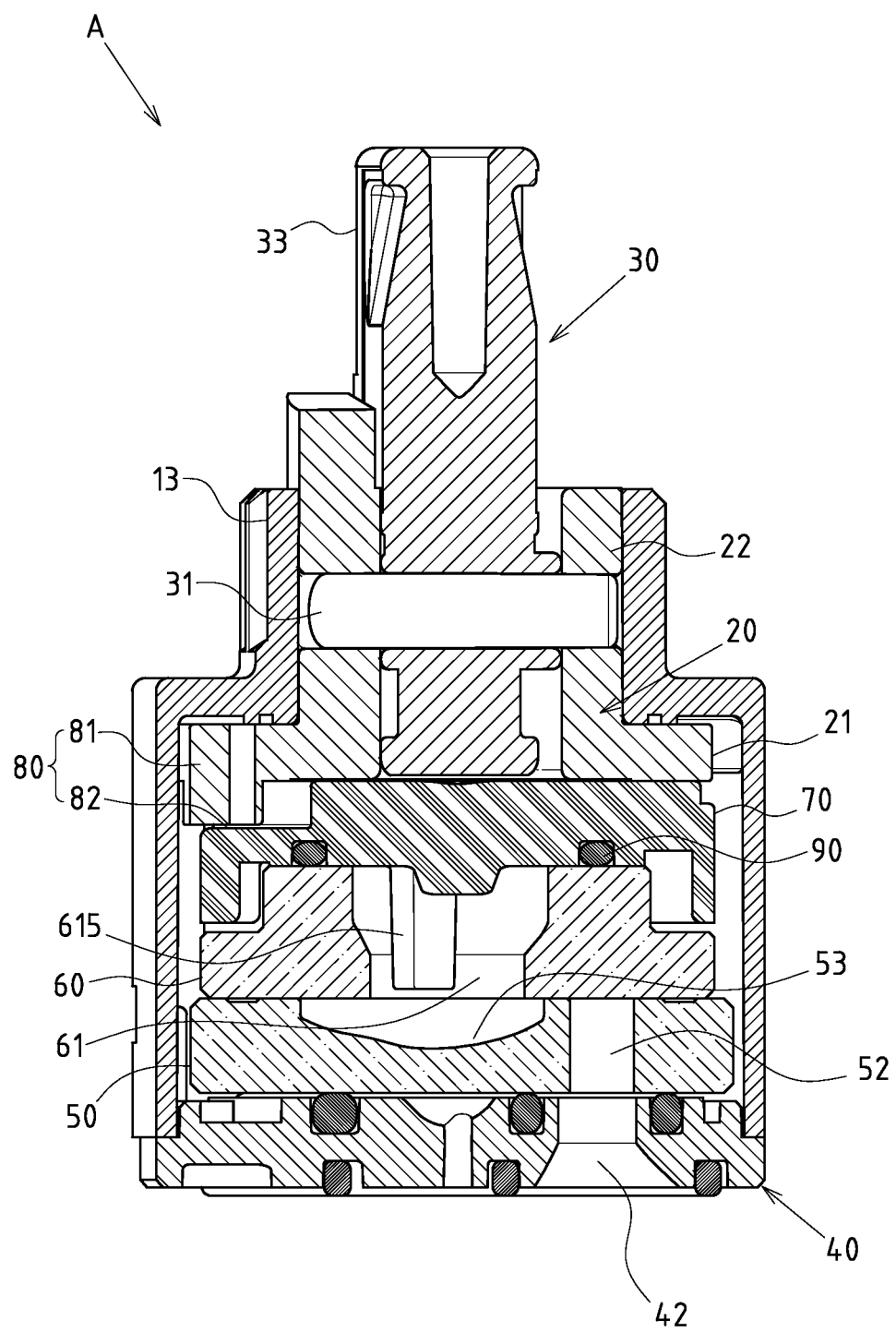
FIG. 4 is a cross-sectional view of the ceramic valve in FIG. 1.
Figure 5:
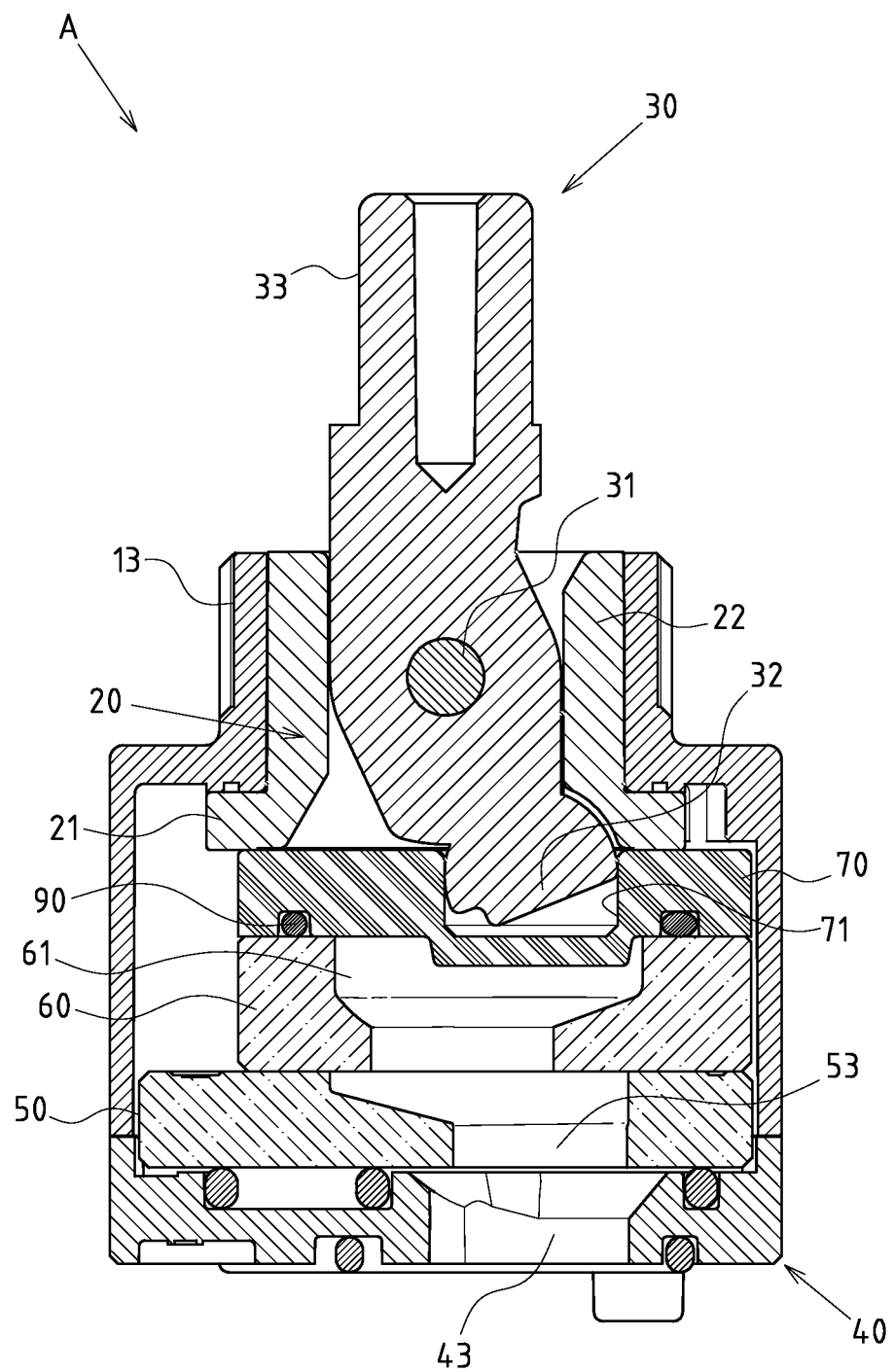
FIG. 5 is a cross-sectional view of the ceramic valve in FIG. 1 in another direction.

With reference to FIGS. 2-4, the tunnel 61 in the rotary block 60 extends through the rotary block 60 such that an O-ring 90 is sandwiched between the coupling seat 70 and the rotary block 60 for preventing the ceramic valve A from leaking.

With reference to FIGS. 3 and 4, at least one spoiler 615 extending from a bottom of the coupling seat 70 into the tunnel 61 for preventing noise due to the water current. The penetrated tunnel 61 is provided for easily forming the spoiler 615 because the spoiler of the conventional ceramic valve extends from a bottom of a blind trough in the rotary block 60 that is made of hard ceramics. The spoiler 615 of the present invention extends from the coupling seat 70 that is made of plastic.

As described above, the ceramic valve A in accordance with the present invention can provide cold water when being in the middle section and pulling the braking rod 30 from an upright status to an inclined status and then the tunnel 61 in the rotary block 60 is moved to communicate with the first through hole 51 in the fixed block 50 to achieve the cold water function in the middle section of the ceramic valve A in accordance with the present invention, wherein the first through hole 51 communicates with the cold water inlet 41 in the pedestal 40.

Although the invention has been explained in relation to its preferred embodiment, it is to be understood that many other possible modifications and variations can be made without departing from the spirit and scope of the invention as hereinafter claimed.

I claim:

1. A ceramic valve apparatus comprising:
a hollow casing with a protrusion extending therefrom, said protrusion having a top opening at a distal end of said hollow casing, said hollow casing having a bottom opening at a bottom thereof;
a drive seat having a lower plate with a tubular position extending upwardly therefrom, said lower plate abutting a lower end of said protrusion, said tubular protrusion rotatably received in said protrusion, said drive seat having a cavity in a center thereof;
a braking rod pivotally connected by a pin to said tubular portion of said drives seat, said braking rod having a toggle and extending through said drive seat, said braking rod having a trigger formed at a top end thereof, said trigger extending upwardly through said drive seat;
a coupling seat receiving said toggle end of said braking rod;
a pedestal secured in said bottom opening of said hollow casing, said pedestal having a cold water inlet and a hot water inlet and an outlet, said cold water inlet adapted to guide cold water into the ceramic valve apparatus, said hot water inlet adapted to guide hot water into the ceramic valve apparatus, said outlet adapted to allow a mixture of the hot and cold water to flow outwardly of the ceramic valve apparatus;
a fixed block securely and sealingly disposed on a top of said pedestal, said fixed block having a first through hole communicating with said cold water inlet and a second through hole communicating with said hot water inlet and a third through hole communicating with said outlet;
a rotary block rotatably disposed on said fixed block, said rotary block having a tunnel defined therein, said tunnel selectively communicating with said first through hole and said second through hole and said third through hole when said rotary block is rotated relative to said fixed block;
a coupling seat disposed between said rotating block and said lower plate of said drive seat, said coupling seat synchronously rotating with the rotary of said rotary block, said coupling seat having a trough defined in a top face thereof, said trough receiving said toggle end of said braking rod, said coupling unit having an indentation in a top face thereof; and
a fulcrum unit having a flanged protrusion extending downwardly therefrom from an edge thereof, said flanged protrusion being received in said indentation of said coupling seat.

2. The ceramic valve apparatus of claim 1, said braking rod being movable from an upright orientation to an inclined orientation.

3. The ceramic valve apparatus of claim 2, said indentation of said coupling seat being rectangular, said flanged protrusion being a shaped selected from the group consisting of a triangle, a circle, a rectangle, and a polygon.

4. The ceramic valve of claim 3, said tunnel of said rotary block extending entirely therethrough, the ceramic valve apparatus further comprising:
an O-ring sandwiched between said coupling seat and said rotary block.

5. The ceramic valve apparatus of claim 4, further comprising:
at least one spoiler extending from a bottom of said coupling seat into said tunnel.

\* \* \* \* \*